United States Patent Office 3,347,200
Patented Oct. 17, 1967

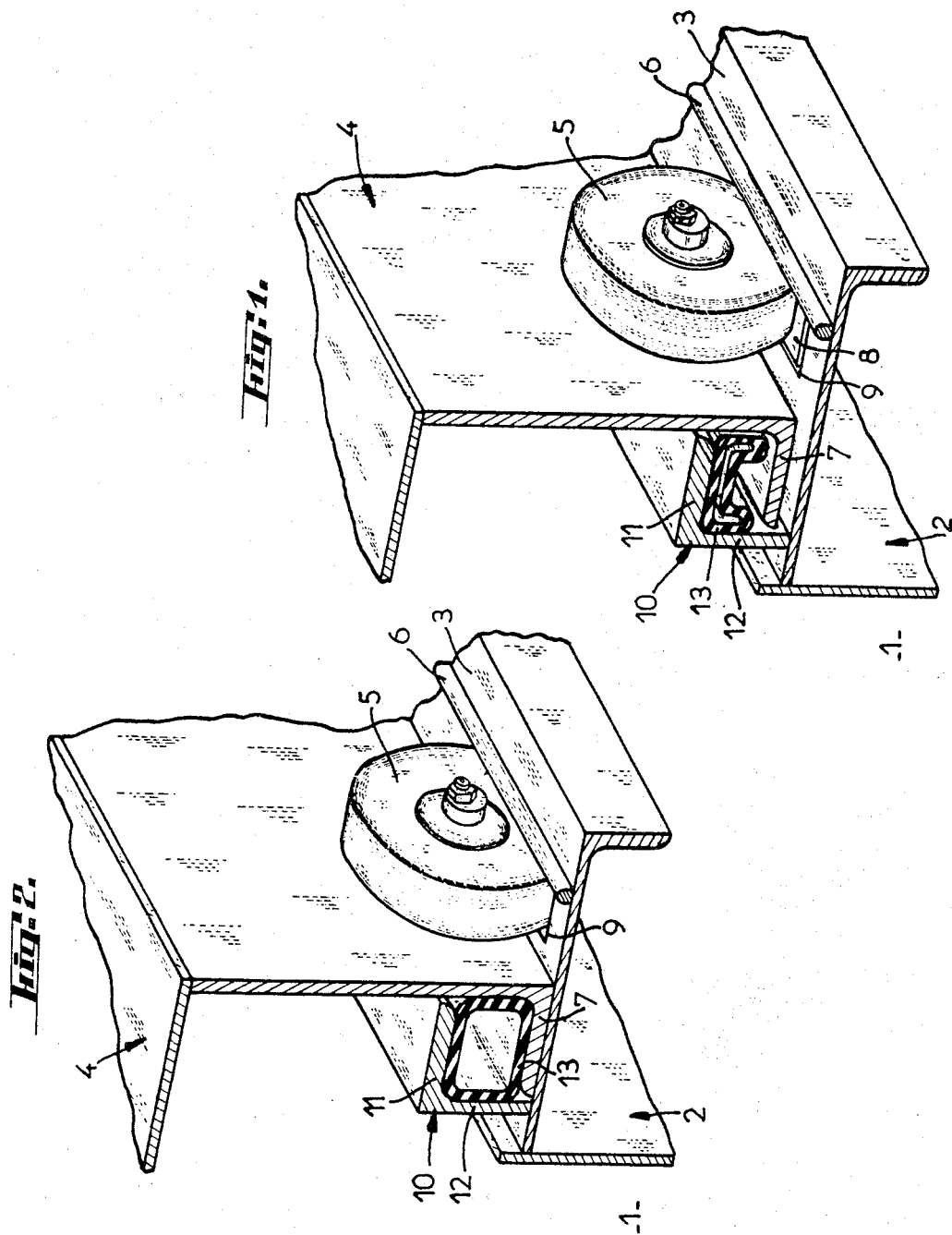

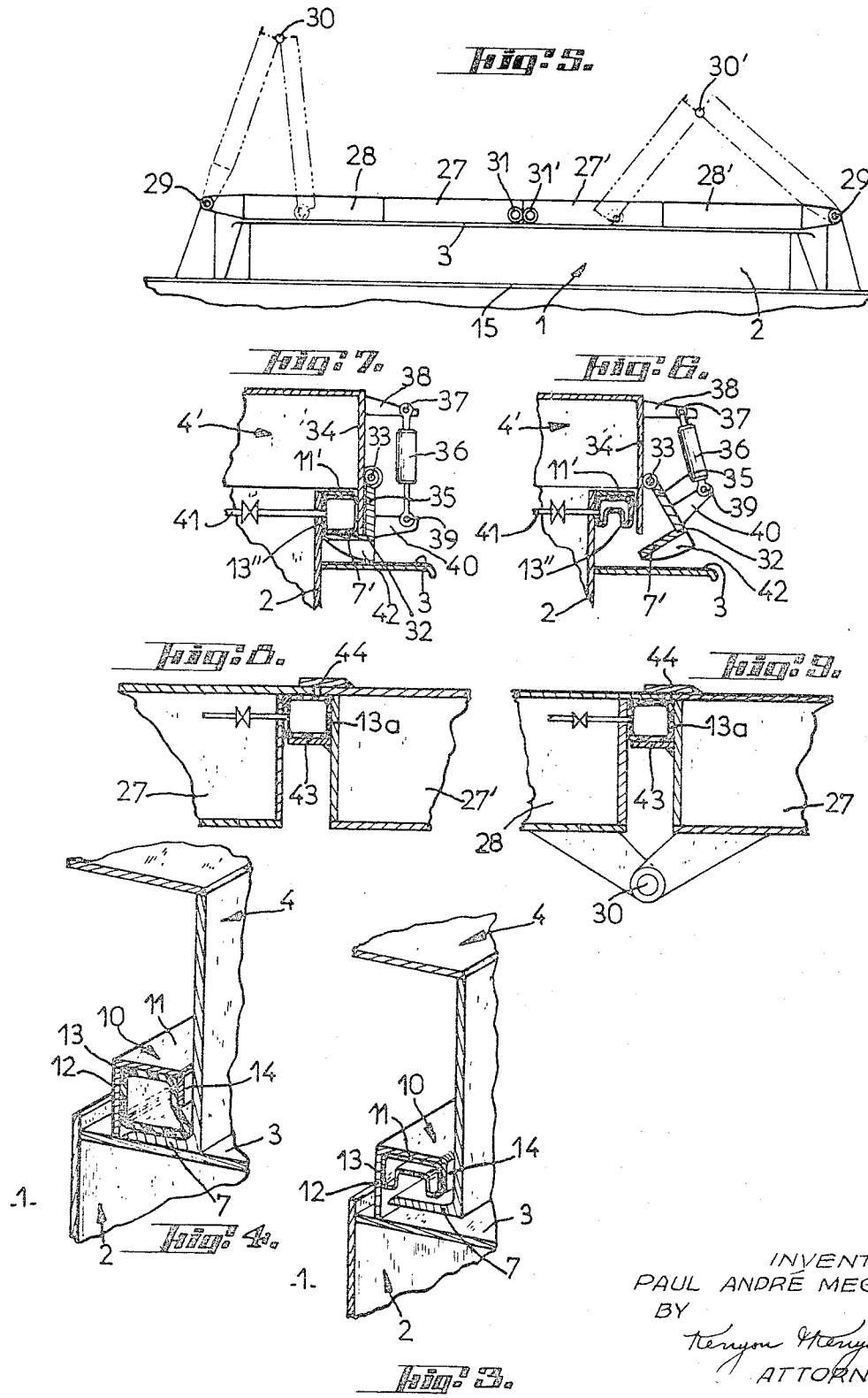

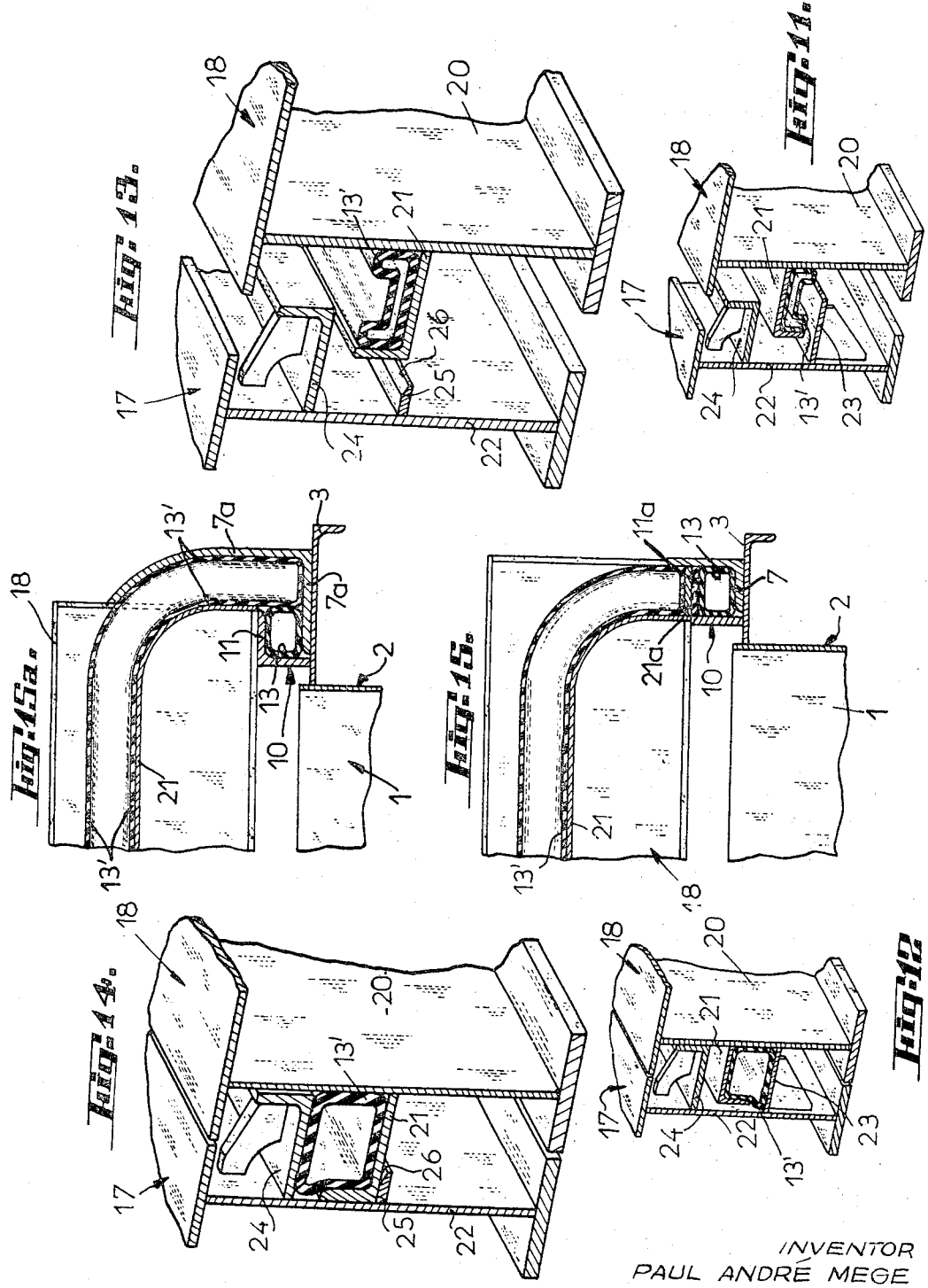

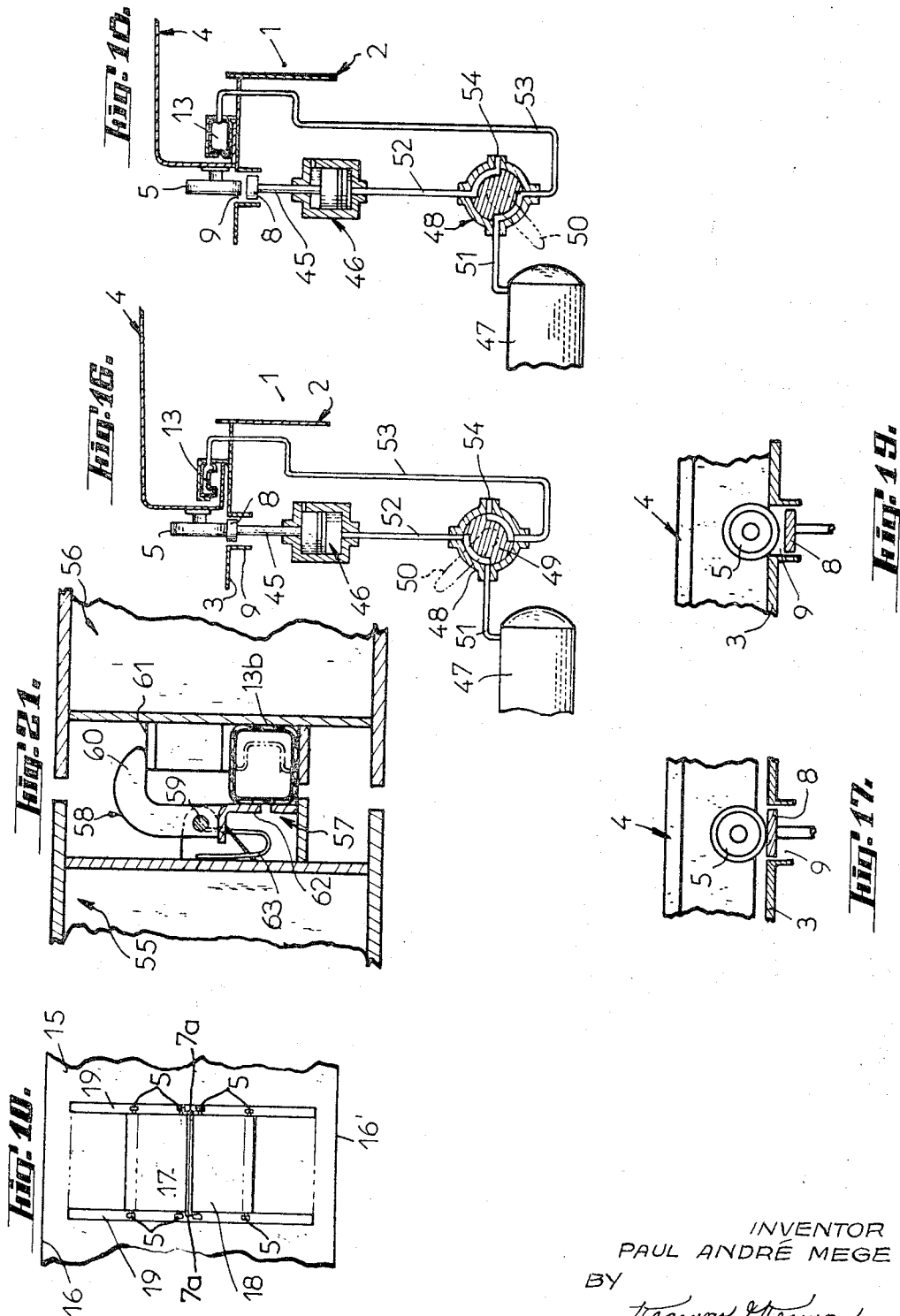

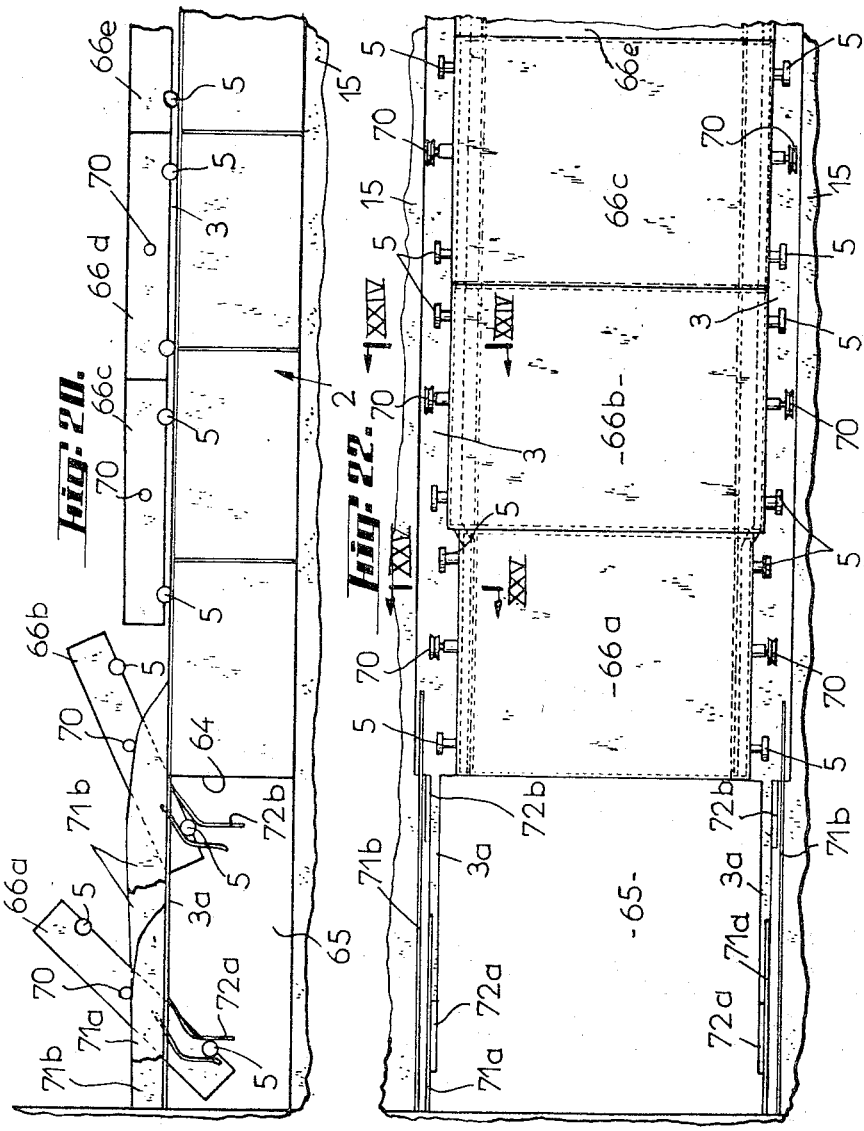

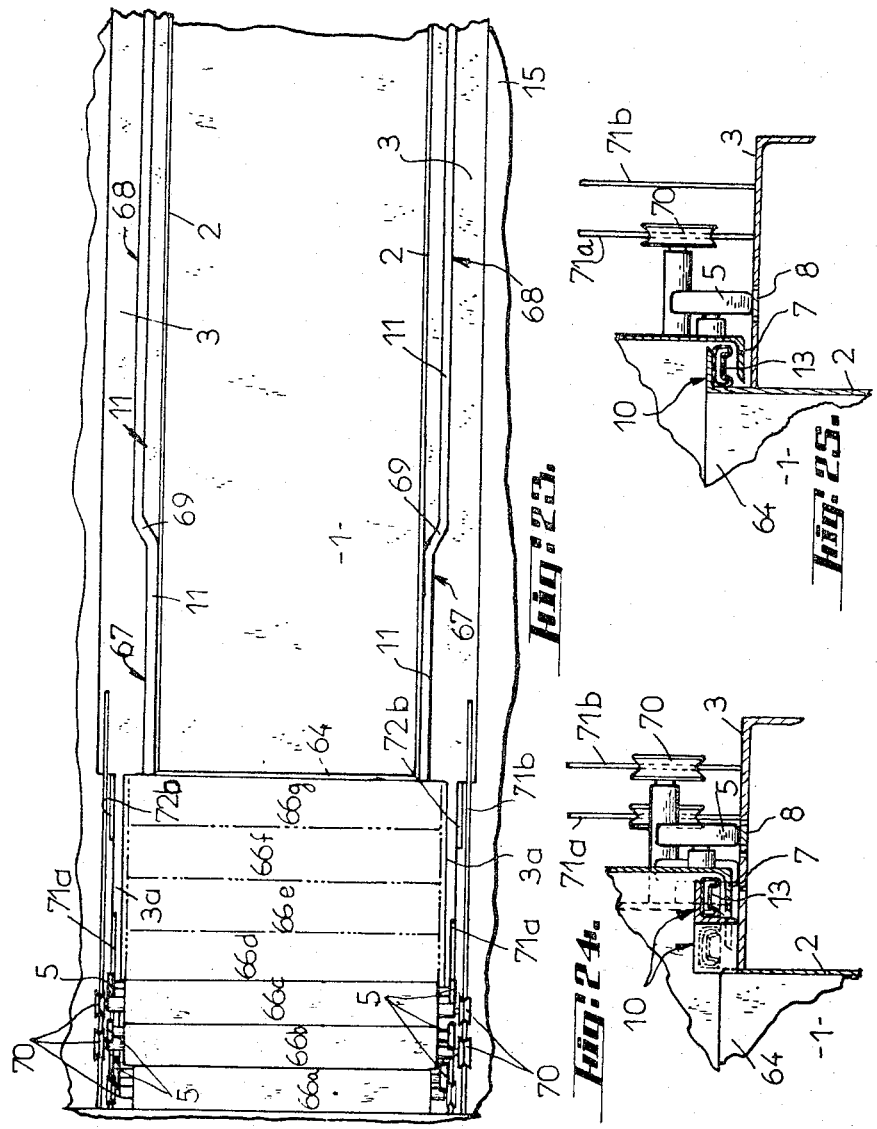

3,347,200
CONTROLLED SELF-LOCKING SEALING DEVICE FOR THE TIGHTLY LOCKED JUNCTION BETWEEN TWO PARTS OR STRUCTURES AND THE VARIOUS APPLICATIONS THEREOF
Paul André Mege, Paris, France, assignor to Mac Gregor-Comarain, Paris, France, a corporation of France
Filed June 24, 1965, Ser. No. 466,611
Claims priority, application France, June 25, 1964, 979,678
16 Claims. (Cl. 114—202)

The present invention essentially relates to a self-locking sealing device operated by a controlled reversible tightening action to make a locked fluid-tight joint between two parts or structures at least one of which is relatively removable or separable from the other, as well as to the various applications thereof and to the apparatus and arrangements fitted with such devices.

Systems of fluid-tight joints between two parts, elements or structural members are known which pertain to the type having a continuous tubular, flexible or resiliently deformable packing, with a single or divided chamber, expandable by inflation through introduction of a compressed fluid, carried by one of said parts and interposed, at least in the fluid-tight meeting position of said parts, between two portions connected to said parts respectively and in tight engagement with said packing in its inflated state. These systems generally exhibit the drawback of requiring accessory or auxiliary arrangements, devices or apparatus for mutually locking the two parts in their fluid-tight meeting position, in order to hold them against motion in this position. In addition to the fact that the presence of these locking members increases the cost of the installation, they require some maintenance as well as workmanship to operate them, unless provision is made for synchronized motorized control systems for automatic and remote actuation of the whole of these locking members, thereby significantly complicating the construction in mounting of the installation.

The object of the present invention is to remove or to cope with the aforesaid drawbacks by using the pressure exerted by the aforesaid packing in its inflated state for carrying out the desired locking or retaining action. To this end, the device according to the invention is characterized in that at least one of said portions between which said packing lies and which is carried by one of said parts, is designed in such a manner with respect to the other part that it forms, by cooperation through pressure contact with said inflated packing, a locking, immobilization or retaining means, holding against motion in at least one direction at least one of said parts relative to the other in its position of fluid-tight junction.

According to another feature of the invention, each aforesaid part comprises a bearing face by which it is adapted to be in pressure contact, in a manner known per se, with a corresponding bearing face of the other part along a common junction surface or edge protected by the aforesaid sealing joint, and both aforesaid portions, which are distinct from said bearing faces and integral with said parts respectively, comprise at least two surfaces or walls of contact with said packing respectively, substantially parallel to and at least partially in front of each other, preferably substantially perpendicular to the direction of the movement of separation and drawing aside or drawing near and tightening of said sealing joint or of the junction between said bearing faces, so that said contact surfaces form said locking means through supporting reaction upon said inflated packing.

According to another feature of the invention, one of said contact walls is interposed between the other contact wall and the bearing face of said part which carries said other contact wall, the opposite face of said interposed contact wall preferably forming at least one portion of said other bearing face.

According to another characteristic feature of the invention, one of said contact walls comprises at least a movable portion adapted to be actuated through engagement with said inflated packing and connected to at least one locking member displaceable between two limit locking and unlocking positions respectively, carried by the part integral with said contact wall and forming preferably a rocking or swinging nose-shaped or hooked lever, adapted to co-operate, in the locking position, with a retaining element integral with the other part, resilient drawback means, such as springs or the like, being provided to urge and return said member in its unlocking position.

The present invention is also concerned with the various applications of the aforesaid device, in particular to movable closure or cover panels for ship hatches or like access openings in rolling vehicles, in buildings and in stationary plants, to covers for passage openings in enclosures, enclosed spaces and vessels and to leaves for doorways, windows or the like. Such closure systems belong preferably to the type having individual successive panels, rolling or sliding on the edge of the aforesaid opening or hingedly connected to each other and foldable, adapted each one, in the closing position, to be in engagement through one bearing face on the lateral or extreme transverse side of each panel, with one corresponding bearing face of the edge of said opening or of the extreme transverse neighbouring end of an adjacent panel, respectively, along a line of junction shielded by the aforesaid sealing joint and with said packing interposed either between each panel and the edge of said opening or between two adjacent panels.

The closure system according to the invention is characterized in that one of said contact surfaces and preferably that which is integral with the edge of said opening, along this latter, is part of a support or housing to which is attached said packing and covering or overhanging at least partially and with a spacing interval, in the approaching position of each aforesaid panel, the other contact surface constituting a sealing seat which is separable from said packing in its inflated state and formed by a continuous marginal element or lateral flange, integral with said panel and located between said packing and said bearing face of the edge of said opening, the shortest distance between said flange and said packing in its deflated state or said support being sufficient to enable said panels to move freely away from said bearing face on the edge of said opening, and said flange and support being preferably provided along two opposite sides or edges of each panel and of said opening, respectively.

According to another feature of the invention, each aforesaid flange is located, as well as said corresponding packing support, at the inside of each aforesaid panel, said flange and said packing forming a kind of baffle preferably located outside of said opening.

According to another feature of the invention, said bearing face of each aforesaid panel on the edge of said opening is formed by that side of said flange which is opposite to said packing.

According to still another feature of the invention, and in the case of hingedly interconnected panels which are foldable or adapted to be removed in a direction which is not parallel to the plane of said opening, each aforesaid flange is removable or at least displaceable with respect to the associated panel, so that it may be removed away from the gap between said packing or said support and the bearing face on the edge of said opening.

According to still another feature of the invention, each aforesaid flange is hingedly connected to its associated panel, so as to be pivotable outwards and actuating means are preferably provided to move said flange.

According to still another feature of the invention, and in the case of the transverse junction between two adjacent panels, which are separable from each other by drawing aside parallel to the plane of the aforesaid opening, the facing and/or front sides or walls of said panels respectively comprise, along substantially the whole useful length of said extreme sides, the aforesaid parallel contact surfaces, overlapping each other at least partially in the closely spaced position and preferably substantially parallel to the plane of said opening, one of said contact surfaces forming the support for the aforesaid packing.

According to still another feature of the invention, and in the case of rolling or sliding cover panels, adapted to individually tilt for being stowed in parallel relationship one behind the other in a position substantially at right angles to the plane of the aforesaid opening, mutually locking means are provided at the intermediate junction between two adjacent panels and the closing position to prevent relative or reversible motion of the adjacent ends of said panels in a direction substantially perpendicular to the plane of said opening, said locking means preferably consisting of at least one rocking or swinging ledge or the like, provided with a drawback spring for returning in the unlocked position, carried by the end front face of a panel and a portion of which forms one portion of the contact surface receiving the pressure of the aforesaid packing in its inflated state, which packing is carried by the other panel, and which pressure moves and maintains said ledge in the locked position wherein it co-operates with a retaining element integral with said other panel.

It will be thus appreciated that said inflatable tubular packing is used not only to make a fluid-tight joint for closure panels, but also at the same time to perform a locking or maintaining action of said sealing joint in the tight state and consequently to maintain or to hold said panels against motion in their fluid-tight closing position.

Other features and advantages of the present invention will become apparent as the following detailed description proceeds, which is intended to illustrate some practical forms of embodiments of the invention.

In the accompanying diagrammatic drawings, given only by way of examples applied to hatch covers for ships:

FIGURE 1 shows a fragmentary sectional perspective view of a rolling hatch cover section in its raised covering or rolling position;

FIGURE 2 is a similar view of the preceding cover section shown in its lowered covering position with fluid-tight closing engagement;

FIGURE 3 is a view drawn to a smaller scale, similar to FIGURE 1, showing a modification of the mounting of the inflatable tubular packing with the cover section in its raised rolling position;

FIGURE 4 is a view similar to the preceding one, showing the cover section in its lowered fluid-tight closing position;

FIGURE 5 is an outside lateral side view, drawn to a smaller scale, of a hatch fitted with two pairs of hingedly connected cover sections, foldable toward the two opposite ends respectively of the hatch and provided with the device according to the invention;

FIGURE 6 is a partial cross-sectional view of a lateral side of a cover section of FIGURE 5 in its horizontal and folded covering position with the sealing device being in the inoperative position enabling the raising or folding of said cover section up to the vertical position;

FIGURE 7 is a view similar to the preceding one, showing the cover section with the sealing device in its fluid-tight closing position;

FIGURE 8 is a lengthwise cross-sectional fragmentary view of the intermediate transverse junction between the adjacent ends of the two central or inner cover sections of FIGURE 5 in the fluid-tight closing position;

FIGURE 9 is a view similar to the preceding one, showing the intermediate transverse junction between the two adjacent hingedly connected cover sections of a pair of pivoted cover sections of FIGURE 5;

FIGURE 10 shows an outside fragmentary top view, drawn to a smaller scale, of a ship's deck having a hatch fitted with a pair of rolling cover sections, adapted to move away from each other in the opening position or to draw near to each other in the closing position, in the transverse direction of the deck;

FIGURE 11 shows, at an enlarged scale, a partial perspective view, along a longitudinal cross-section through the transverse intermediate junction between two rolling cover sections, of the type of FIGURE 10, in the partially spaced apart position of non-fluid tight junction;

FIGURE 12 is a view similar to the preceding one, showing the facing ends of the aforesaid cover sections in the fluid-tight closing meeting position;

FIGURE 13 is a view at an enlarged scale, similar to FIGURE 11 and illustrating an alternative form of embodiment of the transverse sealing device between two adjacent cover sections, in their spaced position with the tubular packing in its deflated state;

FIGURE 14 is a similar view, corresponding to the preceding one and showing the adjacent ends of the two cover sections in their closely meeting position of sealing junction;

FIGURE 15 is a partial view, drawn to a smaller scale, and in transverse cross-section at the front end of a cover section of the type of FIGURE 10, showing the junction of the transverse tubular inflatable joint, at the front end of the cover section, with the longitudinal tubular inflatable joint along the hatch coaming, in the fluid-tight closing position of the cover section;

FIGURE 15a is a similar view of a modification of the preceding arrangement;

FIGURE 16 shows, at a smaller scale, a fragmentary cross-sectional view, of a lateral side of a rolling cover section for a hatch the hatch ledge of which is formed with vertically movable platforms for lowering and lifting the cover section as well as the system for actuating the platforms and for inflating the joint on the coaming, said cover section being shown in its raised rolling position with the joint packing in its deflated state;

FIGURE 17 is a fragmentary outside view from the left side of the cover section of FIGURE 16, with a longitudinal cross-section through the coaming at the location of the lifting orifice and platform, showing a roller of the cover section in the raised position of said platform;

FIGURE 18 is a view similar to FIGURE 16, showing the hatch cover section and the control system in the lowered fluid-tight closing position of the cover section;

FIGURE 19 is a fragmentary view similar to FIGURE 17, showing a roller of a cover section in the lowered position of said platform and resting on the edge of the lowering orifice;

FIGURE 20 shows an outside lateral overall view, with parts broken away, of a hatch fitted with a series of rolling cover sections, individually tiltable to the vertical position for being stowed the ones behind the others in a stowing space adjacent to one end of the hatch;

FIGURE 21 shows at a greater scale, a longitudinal cross-section through the intermediate transverse junction between the meeting ends of two adjacent cover sections of the preceding type, in the locked fluid-tight closing position;

FIGURE 22 shows a top view of the hatch of FIGURE 20, closed by the cover sections and showing its end portion narrowed toward the stowing space, with the last cover section which is also narrower to correspond to this narrowed portion;

FIGURE 23 is a view similar to the preceding one, with the hatch uncovered and the cover sections stowed in the upright position the ones behind the others in the stowing space;

FIGURE 24 is a transverse partial cross-section drawn to an enlarged scale, of the edge of the hatch, taken along the line XXIV—XXIV of FIGURE 22, at the location of the portion with a normal width;

FIGURE 25 is a similar cross-section taken along the line XXV—XXV of FIGURE 22, at the location of the narrowed portion of the hatch ledge.

Referring to the form of embodiment shown on FIGURES 1 and 2 and applicable to any type of rolling hatch cover sections, adapted to roll horizontally on two opposite edges of the hatch and to be lowered in the fluid tight closing position or to be raised in the rolling position, in the hatch covering position, the reference numeral 1 denotes the opening of a ship's hatch, enclosed by or edged with a coaming 2 comprising outwards, along its upper edge, a ledge or the like 3 used as a support and as a runway for a hatch cover section 4 fitted with at least one pair of side rollers or wheels 5 of which one roller only is visible on the figures. The rolling of the rollers 5 on the hatch ledge 3 is guided sidewise by a ridge, bead or the like 6, integral with the top surface of the ledge 3 and projecting upwards from the latter. Each bottom edge of the cover section 4 is formed by a substantially horizontal flange 7 extending the whole useful length of the cover section and preferably substantially perpendicular to the lateral flank or side of cover section 4. In the hatch covering position, each roller 5 of the cover section advantageously rests upon a vertically movable platform or the like 8, forming part of the runway 3 and sealing out, in the raised position of said platform, lifted up to the level of the runway, a hole or orifice 9, formed in said runway and enabling, in the lowered position of said platform 8, the passage of the roller 5, in order to lower the hatch cover section 4 until it rests by its bottom edge or the lower face of its continuous flange 7, upon the coaming ledge, as shown on FIGURE 2.

The bottom flange 7 of the cover section 4 is advantageously directed towards the inside of the cover section 4 and the coaming 2 is formed at its upper portion, with a corresponding continuous counter flange 10, constituted for example by the upper horizontal flange 11 of a continuous longitudinal rail, of angular cross-sectional contour or forming an angle section, the substantially vertical flange 12 of which is integral with the top face of the ledge 3. The stationary flange, formed by the horizontal flange 11 of the angle section 10 and extending parallel with the coaming ledge 3, is directed towards the outside of the hatch and covers or overhangs the bottom flange 7 of the cover section 4 in its hatch covering position, thereby forming a kind of baffle. The outer edge of the flange 11 remains spaced from the inner face of the lateral side 4 of the cover section and the inner edge of the flange 7 remains spaced from the inner face of the vertical flange 12 of the sectional iron 10. A flexible tubular sealing joint packing 13, formed for example by a yieldable or flexible, resiliently deformable pipe or tube, is carried by the element 10, being attached, for example stuck, at least by two outer faces, against the inner horizontal and vertical faces respectively of the flanges 11 and 12 of the element 10. The aforesaid pipe or hose 13 advantageously exhibits, in the natural deflated state or at rest, such as shown on FIGURE 1, a transverse cross-sectional shape of which at least one portion of the outer contour is concave and self-retractable, preferably with a substantially U-shaped profile and adapted, through inflation, to expand outwards substantially in a determined preferential direction, upon assuming a convex configuration, constituting the mainly operative portion of the packing, as shown on FIGURE 2. The concavity of the aforesaid U-shaped contour is advantageously directed downwards, that is towards the horizontal internal or upper face of the flange 7 of the cover section 4 and such a transverse cross-sectional shape exhibits the property of producing, in the inflated state, a considerable accompanying variation of the closed cross-sectional area defined by the contour of the packing or hose. In the instant example shown, the cross-section of the pipe or hose in the inflated state, such as shown on FIGURE 2, is a multiple of that of the pipe or hose 13 in the deflated state, such as shown on FIGURE 1, thereby enabling the pipe or hose 13 to exert in the inflated state a strong pressure upon the flange 7 by means of its contour portion which is initially concave in the deflated state and which becomes convex in the inflated state (see FIGURE 2).

The operation of this self-locking sealing device is very simple. In the deflated state of the tubular packing 13 (see FIGURE 1), the latter has assumed again, through natural elasticity possibly assisted by a slight relative depression created inside, its initial U-shape and is not in contact with said cover section 4 through its free lateral face, in front of the side of cover section 4 and through its free lower face in front of the flange 7. The cover section 4 may therefore, in its raised rolling position shown on FIGURE 1, freely move parallel to the plane top surface of the coaming ledge 3, for being stowed in the hatch opening position or, on the contrary for being brought, still through rolling, to the hatch covering position. To effect a fluid-tight closing, the cover section 4 having been brought in its hatch covering position shown on FIGURE 1, said cover section 4 is lowered through downward collapse of the platforms 8, thereby enabling the rollers 5 to engage the orifices 9 of the coaming ledge until the cover section rests upon the latter by its bottom flange 7 (see FIGURE 2). The flexible pipe or hose 13 is then inflated through introduction of a hydraulic or pneumatic pressure fluid, so that in its expanded state, it strongly applies against the upper or inner face of the horizontal flange 7 and against the inner vertical face of the side wall of cover section 4, thereby making a contact connection or a sealing junction between the stationary coaming 2 and the movable cover section 4. Due to the vertical downward pressure exerted by the inflated pipe or hose 13 upon the flange 7, this latter is firmly applied and maintained against the coaming ledge and owing to the reaction of stationary support provided by the horizontal flange 11 of the stationary flange 10 of the coaming, the cover section 4 is prevented from lifting. The solid friction thus produced between the cover section 4 on the one hand and the coaming ledge 3 and the inflated hose 13 on the other hand, constitutes an efficient retaining means for said cover section which is thus automatically locked in position by simply inflating the hose 13.

In the example shown, the flexible pipe or hose 13 is fastened against the support 10, so that said pipe is part of the stationary coaming 2, thereby considerably facilitating the connecting of the feed ducts or conduits supplying the pressure fluid to said hose. It is however obvious that the hose or pipe 13 could also well be attached on the cover section 4, that is against the top face of the flange 7 and the inner face of the lateral side of the cover section 4, so that upon inflating, it would expand thereby being applied against the inner vertical and horizontal faces, respectively, of the element 10, which are integral with the coaming.

It is also obvious that instead of being arranged at the inside of the cover section 4, the stationary element 10 of the coaming and the flange 7 of the cover section 4 could also well be placed on the outer side of the cover section 4, the rollers 5 being then preferably arranged at the inside of said cover section. However, the inside arrangement, according to that which is shown on the figures, is more advantageous from the point of view of the fluid tightness and it provides a better protection of the sealing device.

FIGURES 3 and 4 are similar to FIGURES 1 and 2, respectively, and show an alternative arrangement of the tubular packing 13. The upper horizontal flange 11 of the packing support 10 terminates outside by a downward directed continuous flange 14 so as to form with the vertical flange 12 a kind of channel, groove or like recess with a transverse cross-sectional contour having substantially the shape of a U with the concavity directed downwards, which concavity constitutes a housing in which is mounted the tubular joint packing 13. In this case, only the lower portion of the tubular packing 13 may expand on the one hand downwards to press upon the lower edge 7 of the cover section 4 and, on the other hand, sidewise to project outwards below the flange 14 of the support 10 so as to be applied against the inner vertical face of the cover section 4.

In the raised rolling position of the cover section 4, the bottom flange 7 of said cover section is lifted so as to be spaced both from the coaming ledge 3 and from the packing 13 in its deflated state or from the lower end of the flange 14 of the support 10.

The sealing device on the coaming is preferably located on the outside of the hatchway 1, that is of the vertical wall of the coaming 2.

The examples of embodiments shown on FIGURES 1 to 4 and also on FIGURES 16 to 19 are particularly suited to the type of closure panels shown on FIGURE 10, which is a fragmentary top view of a ship's deck 15 the side platings of which are shown at 16 and 16' and comprising a hatch closed by two cover sections 17 and 18, preferably and substantially symmetrical in relation to a vertical longitudinal plane of the deck and adapted to move away from or towards each other upon rolling on parallel runways 19 extending transversely to the deck 15. On FIGURE 10, the cover sections 17 and 18 are shown in solid lines in their tightly closed meeting position and in dotted lines in their open spaced apart position.

FIGURES 11 and 12 illustrate the application of the sealing device according to the invention to the transverse junction between two adjacent rolling cover sections such as 17 and 18 for example, separable from each other by moving away parallel to the plane of the hatch. On FIGURE 11, both cover sections 17 and 18 are shown in a partially spaced apart position and the transverse side 20, forming the end or front wall of one of the cover sections, for example of the cover section 18, comprises outside and preferably on all its useful transverse length, a support 21, extending preferably substantially horizontally, projecting from the wall 20 and constituting a housing with its concavity directed for example downwards, wherein is mounted or fastened the inflatable tubular packing 13'. The transverse end wall 22 of the adjacent cover section 17 which extends parallel in front of the wall 20 of the cover section 18, comprises at the outside an element 23 with a substantially horizontal surface, extending the whole transverse useful length of the wall 22, in substantially parallel relation to the support 21 at a lower level of this latter, so that in the meeting position of cover sections 17 and 18, the support 21 and the element 23 overlap each other at least partially and substantially in parallel relation to the plane of the hatch. The inflatable tubular packing 13' is here also preferably of the aforesaid U-shaped cross-sectional type with the concavity directed towards the element 23, so that it may expand between both confronting contact surfaces constituted by the upper surface of the element 23 and the lower surface forming the bottom of the housing or support 21. On FIGURE 11, both cover sections 17 and 18 are partially spaced from each other and the tubular packing 13' is deflated so that there is no engagement between the element 23 and the tubular packing 13'. On FIGURE 12 both cover sections are shown in the meeting position of fluid-tight junction, in which the tubular packing 13' is inflated and firmly applied by its lower portion against the top of the element 23, thereby constituting a fluid-tight joint.

A structural element 24, for example in the shape of angle section or the like, is advantageously integral with one of the cover sections, for example with the cover section 18, being fastened on the inner face of the front wall 22 of said cover section, so as to project substantially horizontally in the spacing gap between the cover sections 17 and 18. This element 24 is disposed preferably above the sealing device 13', 21, 23, so as to constitute an additional baffle improving the tightness of the transverse junction between both cover sections. The element 24 may possibly abut against the adjacent panel 18 in the position of closet meeting of both cover sections, said closet meeting being limited either by abutment of cover section 18 against the element 24 or against the element 23 or against any other portion of the structure of the adjacent cover section 17.

In the position of tight junction of FIGURE 12, the pressure force exerted by the inflated packing 13', presses on the one hand the cover section 17 against the hatch coaming thereby contributing to hold said cover section against motion in conjunction with the sealing devices on the coaming previously described, but tends, on the other hand, through the support reaction against its support, to lift the corresponding end of cover section 18. To neutralize, prevent or avoid such a lifting tendency of cover section 18, the end wall of the adjacent cover section 17, which is not fitted with the inflatable tubular packing, comprises a bearing element substantially parallel to the contact surfaces between which acts said packing in the inflated state and forming a bearing face against which is adapted to apply a corresponding bearing face of the adjacent cover section, constituted for example by that face of the packing support which is opposite to said packing. Thus, in the case of FIGURES 11 and 12, the front or end wall 22 of cover section 17 could comprise an element similar to the element 23 and placed above the support 21 belonging to the other cover section 18 so that in the position of closest meeting of both cover sections, the upper face of the support 21 may be applied against the lower face of this bearing element. Such an additional bearing element could besides be merely made of the lower face of the element 24 shown on FIGURES 11 and 12, in which case said element 24 or the assembly of parts 21, 23, should have such a relative position that the upper face of the support 21 may come in engagement with the lower face of the element 24 in the aforesaid position of closest meeting.

FIGURES 13 and 14 show such a slightly modified approach in which the support 21 and the tubular packing 13' are in an inverted relative position, that is with the concavity turned upwards and the function of the element 23 of FIGURES 11 and 12 is here performed by the lower face of the element 24 against which the packing 13' is made to be applied in the inflated state, whereas instead of the aforesaid element 23, there is a continuous horizontal flange or the like 25, integral with the front wall of cover section 17 and the upper face of which is adapted to come into engagement with the lower face of the support 21, this engagement being assisted preferably by the presence of a chamfer or the like 26 along the end of the flange. The drawing of FIGURE 14 clearly shows that in the position of tight junction, the pressure forces, exerted by the inflated packing 13', apply against two opposite contact surfaces 24 and 25 which are relatively stationary with respect to the cover section 17, so that the tendency to lifting of one of the cover sections and to accompanying or simultaneous lowering of the other cover section are neutralized.

FIGURE 15 shows the manner in which the inflatable tubular packing 13' of a transverse joint between two adjacent cover sections joints the inflatable tubular packing 13 of the sealing device on the coaming. To this end, the transverse packing 13' is bent at the lateral ends of the cover section to run down towards the lower edge of the latter where it is limited by an element 21a integral with the cover section and forming a bottom wall closing the end of the support 21. Below this element 21a, the support 10 on the coaming is devoid of its horizontal flange 11 shown, on FIGURES 1 and 2, which is interrupted at this place and replaced by a flexible or elastic packing 11a of equivalent thickness, resting upon the tubular packing 13 on the coaming and applied against the element 21a.

FIGURE 15a shows a possible alternative approach of the preceding mounting wherein the support or housing 21 projects with its packing 13' laterally from the cover section so as to be juxtaposed by its lower end to the outer side of the packing 13 on the coaming. To this end, the lower edge 7a of the cover section is locally widened correspondingly outwards, projecting from the lateral side or flank of the cover section, to contain the packing 13' on the cover section, so as to rest in engagement with the upper horizontal flange 11 of the support 10 of the packing 13 on the coaming.

FIGURE 5 shows a hatch 1 fitted with two pairs of cover sections 27, 28 and 27', 28', respectively, both cover sections of each pair being hingedly interconnected and said pairs being foldable respectively, preferably up to the vertical position, towards the opposite ends of the hatch. To this end, the outer cover sections, such as 28, 28', are hingedly connected at 29, 29', respectively, to stationary supports at the ends of the hatch, whereas the cover sections 27, 28 and 27', 28' are hingedly interconnected by pairs by means of common pivotal connections 30 and 30'. The central or inner cover sections 27, 27' are provided, towards their free ends, with at least one pair of side rollers such as 31, 31', rolling upon the coaming ledges 3.

It is obvious that in the case of such foldable cover sections, the sealing device on the coaming has to be slightly modified so as to enable the cover sections to get free from the coaming at the time of the folding motion. To this end, according to the practical embodiment shown on FIGURES 6 and 7, each cover section such as 27, 28 or 27', 28', and conveniently denoted here by the general reference character 4', comprises a bottom flange 7' which is movable relative to the cover section 4', so that it may be displaced or moved sidewise away outwards. To this end, each cover section comprises on either side a bottom flange 7', directed preferably to the inside of the cover section and constituted for example by the lower flange of a continuous rail 32 forming an angle section or the like, the other flange of which is pivoted by its upper end at 33 to the side wall 34 of cover section 4'. This wall 34, which advantageously is vertical, is preferably extended at its lower portion so as to project downwards beyond the top of the vertical wall of the coaming 2 in substantially parallel relation to and outside of this latter. The movable edge part 32 is thus adapted to be folded down so that the lower flange 7' assumes a substantially horizontal position and the attached flange 35 of angle section 32 is applied against the outer face of the wall of cover section 34 which extends substantially down to the horizontal flange 7'. The movement of the movable edge portion 32 may be controlled by one or several reversible actuators or the like 36, distributed along each cover section 4' and consisting for example of hydraulic or pneumatic jacks pivotally connected through their cylinder bottom end respectively at 37 to a bracket-bearing or the like 38 integral with cover section 4', and at 39 to an arm or the like 40 outwards integral with the movable edge portion 32.

The inflatable sealing packing 13" is attached on the one hand, for example against the outer face of the vertical wall of coaming 2, and on the other hand, against a substantially horizontal top flange 11' integral with the upper portion of said coaming. One or several pressure fluid ducts or conduits such as 41, extend through the wall of coaming 2 and are connected to each inflatable packing 13". The lower edge portion of the side wall 34 of each cover section 4' extends sufficiently downwards to substantially entirely conceal the inflatable tubular packing 13".

The manner of operation of this sealing device is the following. The movable side edge portions 32 of each cover section 4', representing one of the cover sections 27, 28 or 27', 28', being raised or moved away outwards owing to the action of the double-acting ram or rams 36, each cover section is brought to the horizontal hatch covering position, whereafter the rams 36 are operated to fold the edge portions 32 down against each side wall 34 of cover section 4', so that the flange 7' forms the bottom of the hollow recess or housing defined besides by the coaming 2, the stationary flange 11' and the side wall 34 of the cover section. The tubular packing 13" is then inflated by means of the pipes or ducts 41, thereby causing the expansion of said packing, which firmly applies on the one hand against the lower edge of the vertical wall 34 of each cover section, and on the other hand, against the lower horizontal flange 7' of the movable edge portion 32, pressing this latter downwards. To this end, the horizontal flange 7' rests upon the coaming ledge 3' through the medium for example of structural elements such as 42 having a rounded lower cross-sectional contour so that it may fit easily between the cover section and the coaming ledge upon possibly sliding on this latter. Each cover section thus rests upon the coaming ledge through the medium of the elements 42 and is locked in position against this ledge by the action of the pressure exerted by the inflated packing 13".

To open the cover sections, the operations listed hereinabove are performed in the reverse order of succession, that is the tubular packing 13" is set to exhaust so as to be deflated, whereafter the movable edge portion 32 is folded back upwards or moved away outwards by means of the actuated jacks 36, thereby allowing each cover section to get free from the edge of the coaming during the folding motion.

Of course, the jacks 36 could also consist of reversible electric or mechanical servo-motors, carried by each cover section and coupled to each aforesaid movable edge portion.

FIGURES 8 and 9 respectively show the transverse tight junctions on the one had between the two central cover sections 27, 27', belonging to two different pairs of cover sections, and on the other hand, to two pivoted cover sections 27, 28 of a same pair of cover sections. In both cases, the inflatable tubular packing 13a is carried by one of the cover sections 27 or 28, whereas the other cover section 27' or 27 comprises, on its corresponding front face, a projecting flange 43, so positioned with respect to cover section 27 or 28 that the inflatable packing 13a is enclosed in its inflated state in the space defined by the horizontal flange 43, the confronting vertical front walls of both cover sections and the edge portions of the upper horizontal faces of said cover sections projecting beyond said vertical walls. Each cover section such as 27' or 27 advantageously comprises on its horizontal top face a flat transverse strip 44 forming a buttplate or the like, adapted to cover the spacing or gap between the confronting end edges of the top faces of both adjacent cover sections in their tightly closing position.

The aforesaid embodiments of the sealing devices on the coaming are of course applicable to any type of rolling cover sections the rollers of which rest in the hatch covering position, on platforms or the like, which are in flush relation with the runways, actuated by individual pressure fluid actuators and lowerable below the runways so as to cause said cover sections to rest on the hatch coamings. Such an example is shown, with its control system on FIGURES 16 to 19. Each lifting or raising platform 8 of the cover sections 4 is vertically movable within an orifice 9 of the runway formed by the hatch coaming 3, the length of said orifice being preferably smaller than the diameter of the roller 5 adapted to rest upon said platform and to be engaged in said orifice in the lowered position. FIGURE 17 shows the platform 8 with the roller 6 which it supports, in the raised position, substantially on a level with the top face of the runway 3, thereby closing or sealing up the relevant orifice 9. FIGURE 19 shows the platform 8 in the lowered position with the roller 5 having partially entered the orifice 9 with corresponding lowering of the cover section 4 until it rests on the ledge 3. The contact of each roller 5 with the end edges of the corresponding orifice 9 provides an additional locking action of the cover section 4 against any displacement parallel to the plane of the hatchway.

Each platform such as 8 is connected to the piston rod 45 of an actuator ram, for example of hydraulic or like character 46, directed for example vertically, in which case the piston rod 45 may directly support the platform 8. In this latter case, the actuator ram 46 may only be a single acting actuator since when it is made to exhaust, the proper weight of the cover section 4, of the platform 8, of the piston rod 45 and of the actuator piston is sufficient to cause said piston, hence said platform, to move downwards again to their lowermost position. Instead of separate actuators, it is of course possible to connect in a manner known per se all the platforms by a common mechanical transmission which would be actuated by one or two actuators only. Each actuator 46 is connected to a generally common source of pressure fluid 47 through the medium of a distributor valve or the like 48, preferably of the type comprising a rotary plug 49 having at least three ways and operable by means of a control lever or handle 50. The inner chamber of the distributor valve 48 is connected on the one hand to the source or to the tank of pressure fluid 47 through the medium of a line 51, on the other hand, to the variable volume working chamber of the actuator 46 through a line 52 and eventually to each inflatable tubular packing 13 through the medium of a line 53, whereas it comprises an exhaust orifice or piping 54 possibly connected, through a suitable conduit (not shown), to the source of pressure fluid 47 in the case where the pressure fluid is liquid, or opening directly to the free atmosphere in the case where the pressure fluid is gaseous. The operation of this control system is easily understood. In the system configuration shown on FIGURE 16, where each platform 8 is in the raised position, the rotary plug 49 is in such a position that communication is established on the one hand between the source of pressure fluid 47 and the actuator 46, so that the pressure of said fluid tends to drive the actuator piston upwards to raise the platform 8 and to maintain it in this raised position, and on the other hand, between the inside of each tubular inflatable packing and the free exhaust orifice 54, thereby causing the deflation of said packing. The cover section 4 is thus in a free or non-hindered rolling position.

In the configuration shown on FIGURE 18, the rotary plug 49 has been brought, by means of its operating lever 50, in a relative position wherein it establishes communication on the one hand, between the actuator 46 and the free exhaust orifice 54, thereby causing the pressure of the fluid in said actuator to be reduced to zero or to be reduced and enables the platform 8 to lower by the action of gravity and under the action of the weight of the cover section 4, which has moved down until it rests upon the coaming ledge 3, and on the other hand, between the source of pressure fluid 47 and the inflatable tubular packing 13, thereby causing the inflation of this latter by feeding pressure fluid thereto, thereby resulting in a tight junction between the cover section and the coaming.

The rotary plug is thus movable between two operative end positions. It could of course possibly assume other, for example intermediate, positions such as a neutral or hydraulic lock position.

Each aforesaid inflatable packing such as 13, may comprise either a single chamber, extending the whole useful length of the packing, or be divided by inner partitions in a certain number of sections adapted to be inflated separately or independently from each other, thereby increasing the reliability of the system in the case of an accidental local bursting or puncture of said tubular packing.

FIGURE 20 shows a hatchway fitted with rolling cover sections, which are separable and individually tiltable to the vertical position for being stowed in the open position the ones behind the others in a stowing space adjacent to one end of the hatch. The sealing devices shown on FIGURES 1 to 4 and 16 to 19 are of course applicable to this case.

Since each cover section moves away from the adjacent succeeding or preceding cover section by tilting, that is by raising of one end of the cover section relative to the neighbouring end of the adjacent cover section, it is necessary to provide a sealing and self-locking system at the transverse junction between two adjacent cover sections, adapted to automatically lock said cover sections in their closing position of tight junction. FIGURE 21 shows an embodiment of such a device between two adjacent cover sections such as 55 and 56. It is here assumed that in case of tilting of cover section 56, the end shown is lifted. The sealing device here also comprises an inflatable tubular packing 13b carried preferably by the front end of the cover section 56 and adapted to be applied by inflation against a continuous contact surface belonging to a structural element 57 carried by the neighbouring front end of the adjacent cover section 55. The mutual locking means of both cover sections consists preferably of at least one latch or the like 58, mounted advantageously in a substantially vertical plane for locking or swinging motion about a substantially horizontal pivot pin 59 carried by the cover section 55. This latch comprises at its upper portion a hooking nose or the like 60 adapted to co-operate through locking contact with a retaining element 61 integral with the front end of cover section 56. Its lower portion 62, extending the latch beyond the pivot pin 59, forms a movable portion of the contact or bearing surface 57 receiving the pressure of the inflatable packing 13b in its inflated state, carried by the cover section 56. Several latches may thus be distributed along the length of the transverse junction between the cover sections. Each latch 58 is subjected in addition to the permanent action of a return spring or the like 63, consisting of a loaf spring, a tension or compression coil spring or of a torsion coil or spiral spring, adapted to continuously urge the latch towards its unlocking position, wherein its lower portion 62 projects beyond the alignment with the stationary portion of the bearing or contact element 57.

The operation of this device is the following: when two successive cover sections, such as 56 and 55, are separated, the inflatable tubular packing 13b, carried by the cover section 56, is in the inflated state such as shown in dotted lines on FIGURE 21 and each ledge 58 is held, by its return spring 63, in the unlocking position wherein its lower movable portion 62 constitutes a projection beyond the contact or bearing surface 57 carried by the cover section 55. When both panels 55 and 56 have moved close to each other and are substantially at the same horizontal level, the tubular packing 13b is inflated and expands so as to firmly press upon the contact surface 57 and simultaneously it presses upon the lower portion 62 of the ledge 58, causing it to rock against the counter-action of the return spring 63, until it is brought and held in locking position wherein it co-operates with the retaining element 61 integral with the cover section 56. In this locking position which is shown on FIGURE 21, the relative or reciprocal motion of both neighbouring ends of cover sections 55 and 56, in a substantially vertical direction or perpendicular to the plane of the hatchway, is efficiently prevented, that is the end of cover section 56 cannot raise, whereas the end of cover section 55 cannot be depressed.

It is obvious that the tilting of each cover section up to the vertical position, which is performed by the co-operation of the tipping rollers carried by each cover section with suitable tipping ramps located at the end of the hatch, may only be effected when each cover section has become free from the stationary flange 10 integral with the coaming and carrying the inflatable tubular packing, what may be obtained through a suitable location of the tilting ramps.

However, if the distance, measured transversely to the hatch along its width, between the parallel outer edges of the sealing flanges 11, extending on either side along two longitudinal parallel coamings of the hatch, were the same or constant along the whole useful length of the hatch, it would be necessary that the length of the stowing space be greater than the aggregate thickness or length of the pack of cover sections stowed upright the ones against the others, by an amount at least equal to the length of one cover section, assuming that all the cover sections have the same length, so that the cover sections coming from that end of the hatch which is remote from the stowing space, and in particular the extreme or first cover section, may enter the stowing space sufficiently deeply and just into said excess space, so as to become entirely free from the aforesaid stationary flanges 11 before being tilted to the vertical position. To avoid the requirement for such as excess length in the stowing space, which excess length forms a waste space for the stowing of the cover sections and decreases as much the useful length of the hatch as well as the free available space on the deck, the extreme or last cover section, which is nearest to said stowing space, is narrower than the others and the aforesaid packing supports 10, extending on either side along both longitudinal parallel opposite edges of the hatch, at the location of said last cover section in the closed position, are also nearer to each other transversely along the width of said orifice, then the remaining edges, so that said other cover sections become free from said nearer supports when they assume the closing position of said last cover section respectively.

This arrangement is illustrated by FIGURES 20 and 22 through 25. One end of the hatch is contiguous, by its headledge 64, to a stilling space 65, for example substantially rectangular, adapted to receive in a vertical or standing position and in close order the ones behind the others, the hatch cover sections 66a, 66b, 66c, 66d, 66e, forming, in the horizontal lowered position, a row of successive meeting cover sections, covering the whole of the hatchway. To this end, each cover section 66 is fitted, in a manner known per se, for example with two pairs of aforesaid side rollers 5 resting and rolling upon the coaming ledges 3 and upon the runways 3a in extension of said coaming ledges at the location of the stowing space 65.

It may be assumed that all the cover sections have the same length. The last cover section 66a is less wide or narrower than the other remaining cover sections which have all the same width. This difference in width between the last cover section 66a and each one of the other cover sections is preferably at least equal to twice the width of one flange 11 of the stationary flanges 10 of the coaming, carrying the sealing packing 13. The stationary flanges 10 of both opposite coamings are also nearer to each other by a spacing corresponding to the aforesaid difference, on the portion of length 67 of the hatch at the end adjacent to the stowing space and on a length substantially corresponding to the location occupied by the last cover section 66a in its closing position, so that the overall width between the outer edges of the flanges 11 of the opposite stationary flanges 10 is smaller along the end portion 67 of the hatch, than along the remaining portion 68 of this latter. These two portions 67 and 68, which have a normal and a reduced width respectively, merge into each other in a continuous manner at 69 so that there is no interruption in the sealing device. Both differing relative positions of the stationary flanges 10 with respect to the coamings 2, are clearly apparent on FIGURES 23, 24 and 25.

Each hatch cover section is fitted in addition with at least one pair of tipping side rollers 70. The pair of tipping rollers 70 of the last cover section 66a are adapted to co-operate with a pair of special tilting ramps 71a provided on the edges or sides respectively of the stowing space 65, while the tipping rollers 70 of all the other cover sections are adapted to co-operate with a pair of special tilting ramps 71b also provided on the side edges of the stowing space 65 and extending at least the whole length of these latter. The beginning of the ramps 71a is located at at least such a distance from the hatch that the tipping rollers 70 of the last cover section 66a engage said ramps only when said cover section has become entirely free from the stationary sealing flanges 10 of the portion 67 of the hatch, that is when the cover section 66a has entirely left the hatch, whereas the beginning of the ramps 71b is positioned in such a manner that the tipping rollers of the other cover sections come into engagement with said ramps only when they have become entirely free from the corresponding stationary sealing flanges 10 of the portion 68 of the hatch, that is when each one of these cover sections has occupied substantially the closing position of the cover section 66a on the portion 67 of the hatch.

The pair of rolling tracks of the runways 3a, forming the respective paths of the rollers 5 of the last cover section 66a, terminates by a pair of downward extending guide ramps 72a in which the rollers 5 of the rear pair of rollers of the cover section 66a are adapted to engage. Likewise, the rolling tracks of the runways 3a, forming the path of the rollers 5 of the other cover sections, also terminates by a pair of guide ramps 72b, adapted to receive the pair of rear rollers 5 of each cover section at the time of its tilting. Since the last cover section 66a is less wide than the other cover sections, the tilting ramps 71a and the rolling tracks together with the guide ramps 72a for the last cover section 66a are nearer to each other than the same corresponding elements of the other cover sections, that is the ramps 71b of these latter are outside the aforesaid ramps 71a and the rolling tracks together with the guide ramps 72b are outside of the rolling tracks with the guide ramps 72a.

The operation of this arrangement is the following, assuming initially that the hatch is entirely closed by the cover sections, as shown on FIGURE 22, and that all the cover sections are successively connected to each other by chains, cables, connecting rods or links or the like, in a manner known per se. For the opening step, the last cover section 66a rolls horizontally first on the coaming ledges 3 then on the runways 3a which are assigned thereto until it has at least entirely left the hatch and is approximately arrived at a short distance of its final location of stowing in a vertical position towards the opposite end of the stowing space 65. At this time, it engages, through its tipping rollers 70 and its rear rollers 5, respectively, the corresponding ramps 71a and 72a for being tilted to the vertical position. The next cover section 66c, which is simultaneously driven by its connection with the last cover section 66a, rolls on the coaming ledges 3 until reaching the closing position of the cover section 66a on the portion 67 of the hatch which has reduced or narrowed stationary flanges 10, in which position this cover section 66b has become entirely free from the stationary flanges 10 of the portion 68 having a normal width. The cover section 66b then comes into contact with the associated guide ramps 71b and 72b for being tilted to the vertical position and stowed in an upright position against the last cover section 66a already tilted and located at the end of the stowing space 65. The same operation is thus repeated with the other cover sections 66d, 66e, 66f, 66g, until they have been all stowed in an upright position and in closed order the ones against the others in the stowing space 65, as shown on FIGURE 23. For the closing of the hatch, the preceding operating steps are performed just in the reverse order of succession.

On FIGURE 20, the narrow cover section 66a and the narrow cover section 66b have been shown in simultaneous intermediate tilting positions to facilitate the understanding of the operation. The connecting elements such as chains or the like, connecting the cover sections to each other, have been omitted on these figures to improve their clarity. FIGURE 20 clearly shows that all the cover sections 66b to 66g having a normal width begin to tilt when they still are above the terminal portion of the hatch, corresponding to the closing position of the last cover section 66a. This arrangement has the great advantage to reduce to a strict minimum the required length of the stowing space 65, as shown on FIGURE 23 wherein it is seen that the stowing space is fully occupied by the whole of the cover sections in the opening position, so that there is no free space or waste void.

Of course, this invention should not be construed to be limited to the embodiments described and shown herein which have been only referred to by way of example and the scope of the invention is defined in the appended claims.

What I claim is:

1. A simultaneously sealing and locking device for making, between a first part and a second part which are respectively movable with respect to one another, a temporary locked fluid tight seal when said two parts are in a given relative position with respect to one another of the type including a flexible, deformable tubular packing with a chamber inflatable by introduction of a pressure fluid, carried by one of said parts and interposed, at least in said relative position, between a portion of said first part and a portion of said second part, both in tight engagement with said tubular packing in its inflated state, said portion of said first part comprising at least a first wall in tight engagement with said tubular packing in its inflated state and said portion of said second part comprising a member having a wall parallelly disposed with respect to said first wall and in tight engagement with said tubular packing in its inflated state, one wall having secured thereto a face of said tubular packing, said portions also comprising bearing surfaces allowing a direct contact between said two parts along said bearing surfaces when said tubular packing is in its inflated state, said device being characterized in that said member underlies a substantial portion of said first wall and is interposed in the aforesaid relative position between said first wall and a stop element of said portion of said first part, a first of said bearing surfaces pertaining to said stop element and a second of said bearing surfaces pertaining to said member, the distance between said first wall and said stop element being at least equal to the maximum dimension of said tubular packing in a direction substantially normal to said parallelly-disposed wall and said first wall.

2. A device according to claim 1 characterized in that said tubular packing and said parallelly disposed wall and first wall are substantially horizontal and parallel to a direction along which said parts are relatively movable with respect to one another, one of said portions comprises rollers adapted to roll, when said tubular packing is in its deflated state, on an horizontal runway parallel to said direction, carried by the other portion and comprising long sections and short sections, said short sections constituting movable platforms associated with driving pressure fluid means for placing them in an upper position, on a level with said long parts, in orifices located between said long parts and having a length slightly lower than the diameter of said rollers, when said tubular packing is in its deflated state and in a lower position, below the level of said long parts when said tubular packing is in its inflated state, so as to effect lowering and blocking of said rollers in said orifices in the aforesaid relative positions of said two parts when said tubular packing is in its inflated state and said movable platforms in their lower position, and relative vertical disengagement of said first and second bearing surfaces, when said tubular packing is in its deflated state.

3. A device according to claim 1 characterized in that said parallelly disposed wall is substantially parallel to said first wall, when said tubular packing is in its inflated state, said second part is relatively tiltable with respect to said first part in such a manner that said portion of said second part is relatively movable normally to said first wall, said member is constituted by at least a portion of a tilting section pivotally mounted on said portion of said second part about an axis parallel to said first wall and to said tubular packing and controlled by reversible actuating means connected to said portion of said second part and to said tilting section, the angular stroke of said tilting section being such that one of these extreme positions corresponds to the parallelism between said first wall and said parallelly disposed wall and that the other permits the wholly free relative movement of said portion of said second part normally to said first wall when said tubular packing is in its deflated state.

4. A device according to claim 1 characterized in that said tubular packing exhibits, in its natural deflated state, a cross-sectional shape of which at least a portion of the outer contour is concave and has a substantially U-shaped profile adapted, through inflation of said tubular packing, to expand outwards in a preferential direction upon assuming a convex shape constituting a face of said tubular packing in operative tight engagement with said parallelly disposed wall.

5. A movable closing cover construction for a hatch opening, of the type including a hatch coaming having two lateral sides and two end sides and successive cover sections each one having two lateral sides and two end sides, each one movable with respect to said hatch coaming between an opening position and a closing position of said cover construction and each one adapted, in said closing position, to be in tight contact through its lateral sides with the lateral sides of said hatch coaming and through its end sides with the two adjacent cover sections, except for each extreme cover section, one of the end sides of which is in tight contact with one end side of said hatch coaming and the other in tight contact with the end side of the adjacent cover section, flexible, deformable tubular packings each one with a chamber inflatable by introduction of a pressure fluid, carried by said hatch coaming and each one interposed, at least in said closing position, between a section of a lateral side of said hatch coaming and a lateral portion of a cover section, both said section and said lateral portion being in tight engagement with said tubular packing in its inflated state, said section comprising at least a first wall in permanent tight engagement with said tubular packing which is secured thereto and said lateral portion comprising a member having a wall parallelly disposed with respect to said first wall and in tight engagement with said tubular packing in its inflated state, said section and said lateral portion also comprising bearing surfaces allowing a direct contact between said cover section and said lateral side along said bearing surfaces when said tubular packing is in its inflated state, said movable closing cover construction being characterized in that for providing simultaneously sealing and locking means between said section and said lateral portion, said member underlies a substantial portion of said first wall and is interposed in the aforesaid relative position between said first wall and a stop element of said section, a first of said bearing surfaces pertaining to said stop element and a second of said bearing surface to said member, the distance between said first wall and said stop element being at least equal to the maximum dimension of said tubular packing in a direction substantially normal to said parallelly disposed wall and said first wall.

6. A cover construction for a hatch opening according to claim 5 characterized in that said tubular packing and said parallelly disposed wall and first wall are substantially horizontal and parallel to the longitudinal direction of the lateral sides of said hatch coaming along which said cover sections are rectilinearly movable, said lateral portion of a cover section comprises side rollers adapted to roll, when said tubular packing is in its deflated state, on an horizontal runway parallel to said direction, carried by said section of a lateral side of said hatch coaming and constituting of long sections and short sections, said short sections constituting movable platforms associated with driving pressure fluid means for placing them in an upper position, on a level with said long parts, in orifices located between said long parts and having a length slightly lower than the diameter of said rollers, when said tubular packing is in its deflated state and in a lower position, below the level of said long parts when said tubular packing is in its inflated state, so as to effect lowering and blocking of said rollers in said orifices in the aforesaid closing position of said cover section when said tubular packing is in its inflated state, and vertical disengagement of said second bearing surface from said first bearing surface when said tubular packing is in its deflated state.

7. A cover construction for a hatch opening according to claim 5 characterized in that said tubular packing and said first wall are substantially horizontal and parallel to the longitudinal direction of the lateral sides of said hatch coaming, said parallelly disposed wall is substantially horizontal when said tubular packing is in its inflated state, said cover sections are associated with driving means for simultaneously displacing at least all of them except the extreme ones along said direction and tilting them so as to bring them from said closing position to said opening position and reciprocally, said member is constituted by at least a portion of a tilting section pivotally mounted on said lateral portion about an horizontal axis parallel to said direction and controlled by reversible actuating means connected to said lateral portion and to said tilting section, the angular stroke of said tilting section being such that one of its extreme positions corresponds to the aforesaid horizontal position of said parallelly disposed wall and that the other permits the wholly free upward and downward movement of said cover section when it is brought from said closing position to said opening position and reciprocally and when said tubular packing is in its deflated state.

8. A cover construction for a hatch opening according to claim 7 characterized in that said tilting section is constituted by an angle section having a bottom flange and an attached flange, said bottom flange comprises an extension having a curved contour, said bottom flange and its extension constitute said member and said curved contour said second bearing surface which is in contact with said first bearing surface when said tilting section is in its extreme position corresponding to said horizontal position of said parallelly disposed wall and which is disengaged from it when said tilting section is in its other extreme position and said reversible actuating means are double acting jacks the cylinders and rods of which are pivotally connected to said lateral portion and to said tilting section.

9. A cover construction for a hatch opening according to claim 5 characterized in that said section of a lateral side of said hatch coaming comprises a second wall substantially normal to said first wall, connecting said first wall to said stop element and in tight engagement with said tubular packing in its inflated state.

10. A cover construction for a hatch opening according to claim 5 characterized in that said tubular packing exhibits, in its natural deflated state, a cross-sectional shape of which at least a portion of the outer contour is concave and has a substantially U-shaped profile adapted, through inflation of said tubular packing, to expand outwards in a preferential direction upon assuming a convex shape constituting a face of said tubular packing in operative tight engagement with said wall.

11. A cover construction for a hatch opening according to claim 5 characterized in that the tight contact between the end sides of said extreme cover sections and the end sides of said hatch coaming, and the tight contact between the end sides of adjacent cover sections is ensured by other flexible, deformable tubular packings each one with a chamber inflatable by introduction of a pressure fluid, the ends of which constituting tight seals in conjunction with the ends of the tubular packings interposed between the lateral sides of said hatch coaming and the lateral portions of said cover sections.

12. A cover construction for a hatch opening according to claim 11 characterized in that said cover sections are rectilinearly movable along the lateral sides of said hatch coaming and comprises a first cover section and a second cover section adapted to move away from each other and to draw near to each other, said first cover section having on its end side cooperating with said second cover section a first horizontal flange and a second horizontal flange and said second cover section having on its end side cooperating with said first cover section a third horizontal flange, said third horizontal flange is interposed between said first horizontal flange and said second horizontal flange and in bearing contact with said second horizontal flange when said cover sections are in said closing position, one of said other tubular packings is secured to one of said first and third horizontal flanges on the face thereof facing the other of said first and third horizontal flanges in said closing position, a stop member is carried by one of said two cover sections and comes in abutment with the other of said two cover sections in said closing position and the distance between said first horizontal flange and said third horizontal flange being such that said last-named tubular packing in its inflated state is in tight contact with that of said first and third horizontal flanges to which it is not secured.

13. A cover construction for a hatch opening according to claim 11 characterized in that said cover sections are independent from one another and associated with driving means for simultaneously displacing them along the longitudinal direction of the lateral sides of said hatch coaming and tilting them so as to bring them from said closing position to said opening position for stowage into an end stowage space where they are vertically positioned and reciprocally, one of said other tubular packings is interposed between two adjacent cover sections and the junction therebetween as well as mutual locking means in said closing position, said mutual locking means preventing any relative movement of the adjacent end faces of said two adjacent cover sections in a direction substantially vertical and comprising a latch brought to its locked position by displacement of a portion of said last-named tubular packing caused by the inflation thereof, said latch being maintained in said locked position by said last-named tubular packing in its inflated state.

14. A cover construction for a hatch opening according to claim 13 characterized in that said latch includes a return spring for urging same to its unlocked position and is pivotally mounted on one of said adjacent end faces, one part of said end face is integral with said latch and in tight engagement at its inflated state with said last-named tubular packing which is carried by the other of said adjacent end face and a retaining element carried by said other end face cooperates with said latch in its locked position.

15. A movable closing cover construction for a hatch opening, of the type including a hatch coaming having two lateral sides and two end sides and successive cover sections each one having two lateral sides and two end sides, each one movable with respect to said hatch coaming between an opening position and a closing position of said cover construction and each one adapted, in said closing position, to be in tight contact through its lateral sides with the lateral sides of said hatch coaming and through its end sides with the two adjacent cover sections, except for each extreme cover section, one of the end sides of which is in tight contact with one end side of said hatch coaming and the other in tight contact with the end side of the adjacent cover section, flexible, deformable tubular packings each one with a chamber inflatable by introduction of a pressure fluid, carried by said hatch coaming and each one interposed, at least in said closing position, between a section of a lateral side of said hatch coaming and a lateral portion of a cover section, both said section and said lateral portion being in tight engagement with said tubular packing in its inflated state, said section comprising at least a first wall, substantially horizontal and parallel to the longitudinal direction of the lateral sides of said hatch coaming along which said cover sections are rectilinearly movable, in permanent tight engagement with said tubular packing which is secured thereto and said lateral portion comprising a member having a wall parallelly disposed with respect to said first wall, substantially horizontal and parallel to said longitudinal direction and in tight engagement with said tubular packing in its inflated state, said section and said lateral portion also comprising bearing surfaces allowing a direct contact between said cover section and said lateral side along said bearing surfaces when said tubular packing is in its inflated state, said lateral portion of a cover section comprising side rollers adapted to roll, when said tubular packing is in its deflated state, on an horizontal runway parallel to said direction, carried by said section of a lateral side of said hatch coaming and consisting of long sections and short sections, said short sections constituting movable platforms associated with driving pressure fluid means for placing them in an upper position, on a level with said long parts, in orifices located between said long parts and having a length slightly lower than the diameter of said rollers, when said tubular packing is in its deflated state and in a lower position, below the level of said long parts when said tubular packing is in its inflated state, so as to effect lowering of said rollers in said orifices in the aforesaid closing position of said cover section when said tubular packing is in its inflated state, and vertical disengagement of said second bearing surface from said first bearing surface when said tubular packing is in its deflated state, said movable closing cover construction being characterized in that for providing simultaneously sealing and locking means between said section and said lateral portion, said member underlies a substantial portion of said first wall and is interposed in the aforesaid relative position between said first wall and a stop element of said section, a first of said bearing surfaces pertaining to said stop element and a second of said bearing surfaces to said member, the distance between said first wall and said stop element being at least equal to the maximum dimension of said tubular packing in a direction substantially normal to said parallelly disposed wall and said first wall, said driving pressure fluid means comprising pressure fluid actuated jacks, at least one three-way distributor valve including a rotary plug, connected through ducts to at least one source of pressure fluid respectively to said jacks and to said tubular packing, said plug having at least two positions, which are respectively, one position for feeding said jacks and for simultaneously deflating said tubular packing and another position for inflating said tubular packing and for simultaneously exhausting said jacks.

16. A movable closing cover construction for a hatch opening, of the type including a hatch coaming having two lateral sides and two end sides and successive cover sections each one having two lateral sides and two end sides, each one movable with respect to said hatch coaming between an opening position and a closing position of said cover construction and each one adapted, in said closing position, to be in tight contact through its lateral sides with the lateral sides of said hatch coaming and through its end sides with the two adjacent cover sections, except for each extreme cover section, one of the end sides of which is in tight contact with one end side of said hatch coaming and the other in tight contact with the end side of the adjacent cover section, a first set of flexible, deformable tubular packings each one with a chamber inflatable by introduction of a pressure fluid, carried by said hatch coaming and each one interposed, at least in said closing position, between a section of a lateral side of said hatch coaming and a lateral portion of a cover section, both said section and said lateral portion being in tight engagement with said tubular packing in its inflated state, said section comprising at least a first wall in permanent tight engagement with said tubular packing which is secured thereto and said lateral portion comprising a member having a wall parallelly disposed with respect to said first wall and in tight engagement with said tubular packing in its inflated state, said section and said lateral portion also comprising bearing surfaces allowing a direct contact between said cover section and said lateral side along said bearing surfaces when said tubular packing is in its inflated state, the tight contact between the end sides of said extreme cover sections and the end sides of said hatch coaming, and the tight contact between the end sides of adjacent cover sections is ensured by a second set of flexible, deformable tubular packings each one with a chamber inflatable by introduction of a pressure fluid, the ends of which constituting tight seals in conjunction with the ends of the tubular packings of said first set interposed between the lateral sides of said hatch coaming and the lateral portions of said cover sections, said movable closing cover construction being characterized by providing simultaneously sealing and locking means between said section and said lateral portion, said member underlies a substantial portion of said first wall and is interposed in the aforesaid relative position between said first wall and a stop element of said section, a first of said bearing surfaces pertaining to said stop element and a second of said bearing surfaces to said member, the distance between said first wall and said stop element being at least equal to the maximum dimension of the corresponding tubular packing of said first set in a direction substantially normal to said parallelly disposed wall and said first wall, said cover sections are rectilinearly movable along the lateral sides of said hatch coaming and comprise a first cover section and a second cover section adapted to move away from each other and to draw near to each other, said first cover section having on its end side cooperating with said second cover section a first horizontal flange and a second horizontal flange and said second cover section having on its end side cooperating with said first cover section a third horizontal flange, said third horizontal flange is interposed between said first horizontal flange and said second horizontal flange and in bearing contact with said second horizontal flange when said cover sections are in said closing position, one of the tubular packings of said second set is secured to one of said first and third horizontal flanges on the face thereof facing the other of said first and third horizontal flanges in said closing position, a stop member is carried by one of said two cover sections and comes in abutment with the other of said two cover sections in said closing position and the distance between said first horizontal flange and said third horizontal flange being such that said last-named tubular packing in its inflated state is in tight contact with that of said first and third horizontal flanges to which it is not secured.

References Cited

UNITED STATES PATENTS

| | | |
|---|---|---|
| 2,360,276 | 10/1944 | Redmond. |
| 2,843,422 | 7/1958 | Black. |
| 2,917,017 | 12/1959 | Stransky _____ 114—202 |
| 3,104,643 | 9/1963 | Vallet. |
| 3,180,302 | 4/1965 | Hamilton _____ 114—203 |
| 3,198,159 | 8/1965 | Cherney et al. _____ 49—477 X |

FOREIGN PATENTS 94,104  8/1959  Norway.

MILTON BUCHLER, *Primary Examiner.*

ANDREW H. FARRELL, *Examiner.*